UNITED STATES PATENT OFFICE 2,601,550

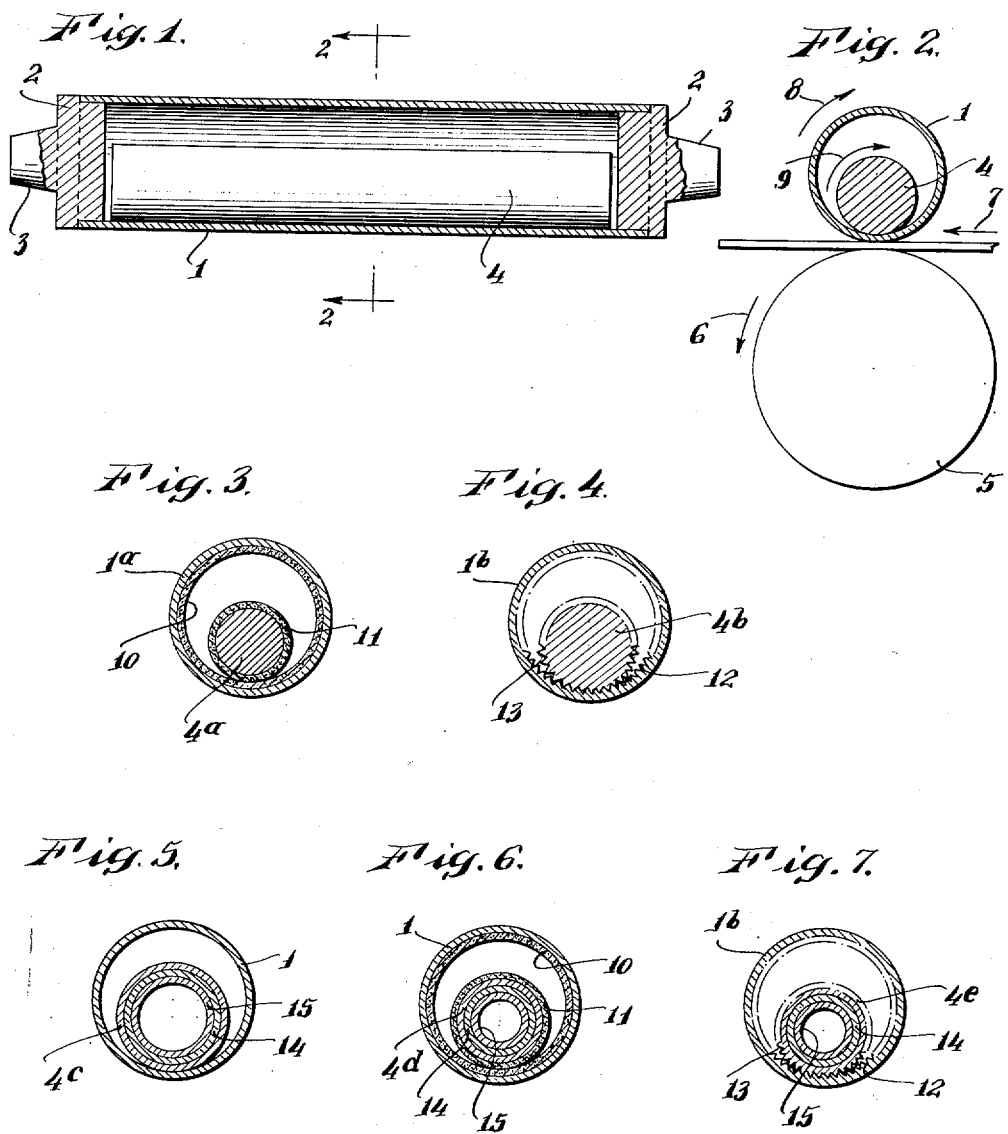

PRESSURE ROLLER FOR DRAWING DEVICES

Albert Nau-Touron, Le Vesinet, France, assignor to Societe a Responsabilite Limitee Fonderie de Precision, Nanterre, France Application September 21, 1945, Serial No. 617,880
In France October 1, 1941

Section 1, Public Law 690, August 8, 1946
Patent expires October 1, 1961

1 Claim. (Cl. 19—142)

This invention relates to improvements in pressure rollers used on drawing devices for all natural or artificial textiles and in particular in intermediate pressure rollers sometimes termed "floaters" in the art.

The main object of the invention is to provide a roller which is so devised as to be loaded at will in order to alter its total weight.

The total weight of the roller may thus be determined according to the nature of the fibres being worked, whether cotton, wool, wood fibre, rayon, "Lanital" or others, or a mixture of certain of these, and also according to the characteristics of these fibres (length of staple, length of fibre, crimp, etc.) and likewise to the rolling ratio, in order to obtain best results in the gripping, feeding, and guiding effects for said fibres (whether long, short, or floating).

Another object of the invention is to provide a roller consisting of a tube closed at both ends by plugs one of which at least is removable so as to allow of introducing into the roller or of extracting therefrom various loads.

The plugs comprise, as is customary, a stud for maintaining the whole in grooves provided in the roller stand of the frame.

These loads may consist:

Either of a solid or tubular cylinder whose outer diameter is equal or inferior to the inner diameter of the roller.

Or of cylindrical bars or rods.

Or of a liquid, etc.

A further object of the invention is to provide means, particularly in the event of cylindrical or tubular loads, for increasing the adherence between the loads and the inner surface of the roller. To this end, the surfaces concerned may be sand-blasted or covered with a suitable coating (felt, rough shag or the like). In certain cases, means can even be provided for either connecting the load to the roller or for a gear transmission between the roller and the load.

The invention also comprises within its scope, the novel industrial product constituted by the pressure roller with adjustable total weight as defined above.

Further features, likewise comprised within this invention's scope, will be made apparent from the following description and referring to accompanying drawing, given by way of example only, and in which;

Fig. 1 is a longitudinal axial sectional view in elevation, of a pressure roller improved according to the invention.

Fig. 2 is a cross section on line II—II of Fig. 1 and shows the roller in operative position.

Figs. 3 to 7 are cross-sections similar to that of Fig. 2 but showing respectively in Fig. 3 the coating of the contacting surfaces of the cylinders with suitable rough materials, in Fig. 4 the connection between said surfaces by a gear transmission, in Fig. 5 the provision of additional weight by interfitting tubes and in Figs. 6 and 7 the modification of the arrangement of Fig. 5 in accordance with that of Figs. 3 and 4.

The intermediate pressure roller, shown solely by way of example, consists of a tubular cylindrical body 1 the ends of which are closed by plugs 2, one at least of said plugs being removable. These plugs are constituted by outer roller studs 3 freely engaged in corresponding grooves of the roller stand in a known manner.

The whole unit consisting of hollow cylinder 1 and plugs 2 has a total weight equal to or smaller than the maximum weight that may be required to obtain the best result. However, in all other cases, the total weight of the unit, which is preferably made out of a light or extra-light alloy, is too small and must be supplemented according to the nature and the characteristics of the fibres.

The additional weight required to obtain this satisfactory effect on the fibres is obtainted, in the form of embodiment shown, by means of a cylinder 4, solid or tubular, whose outer diameter is equal or preferably inferior to the inner diameter of tubular cylinder 1. However, it seems profitable to select the outer diameter of cylinder 4 in such a way that it will be as close as possible to the inner diameter of tubular cylinder 1, in order that the angular speeds of these two elements should differ but slightly and that the driving torque acting on cylinder 4 should thus be maximum.

It is of course possible to design tube 4 so that it should be a friction fit in tubular cylinder 4 so that these two elements should substantially rotate together as a whole.

The total length of additional cylinder 4 is slightly less than the length of the free space within tubular cylinder 1.

The roller previously described operates as follows:

A cylinder 5, either grooved or smooth, pertaining to the drawing device, is positively driven in rotation in the direction of arrow 6, while the fibres travel in the direction of arrow 7. Onto roller 5 is superimposed, so as to freely weigh on said roller, the novel roller unit according to the invention, said roller being driven, in the usual way, in direction of arrow 8, by the sliver of fibre.

Additional roller 4, in the event when the same is free within roller 1, is tangentially driven in rotation by cylinder 1, in the direction of arrow 9.

As indicated in the above disclosure, adherence between the contacting surfaces of roller 1 and cylinder 4 may be increased by any suitable means such as sandblasting, coating with suitable materials (felt, rough shag etc.) as illustrated at 10 and 11 in Fig. 3 on the contacting surfaces of cylinders 1a and 4a, or by a connection by gear transmission as illustrated at 12 and 13 in Fig. 4 between cylinders 1b and 4b. In all cases the pressure roller and the inner cylinder or cylinders are moved together in the same direction.

A set of additional cylinders or tubes such as 4 of varying weights is available, so as to alter the total weight of the roller in accordance with the properties of the textile fibres being treated, with the rolling ratio or the simple tension ratio existing between grooved roller 5 and the rollers cooperating with same. To alter this total load, it is simply necessary to remove one of plugs 2 and substitute for cylinder 4 another cylinder of suitable weight.

In practice, it appears profitable to provide the set of additional cylinders in the shape of tubes of decreasing diameter 4c, 14 and 15 (Fig. 5), fitting into each other. It will then be possible to consecutively add a certain number of tubes in order to obtain the desired weight while the last-added element 15 may be solid.

Figure 6 illustrates a device having telescopic tubes 14 and 15 as in the device of Figure 5 and an outer telescopic tube 4d similar to the tube 4c of Figure 5 but coated at 11 similarly to the rod 4a of Figure 3. Likewise Figure 7 illustrates a set of telescopic tubes 14 and 15 as in Figures 5 and 6 and an outer tube 4e similar to the tubes 4c and 4d of Figures 5 and 6 but geared at 13 similarly to the rod 4b of Figure 4, the roller 1b, geared at 12, being identical with the roller 1b of Figure 4.

It seems at the present time advantageous to make tubes 4 and rollers 1 out of light or extra-light alloys.

I claim:

In a pressure roller of a drawing device for natural and artificial textile fibers, a hollow cylinder, means for simultaneously closing the ends of said cylinder and rotatably driving the same, the weight of said cylinder and said closing means being at the most equal to the minimum weight necessary for obtaining a drawing effect, one at least of said closing means being removable, a cylindrical device formed by a set of telescopical cylindrical tubes and insertable within said cylinder for varying according to the number of tubes simultaneously used the weight generating said drawing effect as a function of the nature of the fibers to be drawn, so that said inserted tubes are driven in the same rotary direction as that of said cylinder, whereby the upper and lower fibers of the sliver have the same displacements during the drawing operation, said tubes having a length slightly less than that of the free space within said cylinder and the outer tube of said set having an outer diameter comprised between the inner radius and diameter of the roll so that the angular speeds of said inserted tubes and said cylinder are near while said inserted tubes are submitted to the maximum driving torque, whereby the pressure exerted by the roller on the sliver of fibers is optimum and remains constant during a drawing operation.

ALBERT NAU-TOURON.

REFERENCES CITED

The following references are of record in the file of this patent:

UNITED STATES PATENTS

| Number | Name | Date |
|---|---|---|
| 178,631 | Hadley | June 13, 1876 |
| 1,196,464 | Lee | Aug. 29, 1916 |

FOREIGN PATENTS

| Number | Country | Date |
|---|---|---|
| 4,491 | Great Britain | of 1876 |
| 80,517 | Switzerland | Mar. 17, 1919 |
| 497,286 | France | Dec. 31, 1918 |